Sept. 29, 1959  A. L. FACCOU  2,906,548
SWIVEL JOINT AND SEAL ASSEMBLIES
Filed March 9, 1955
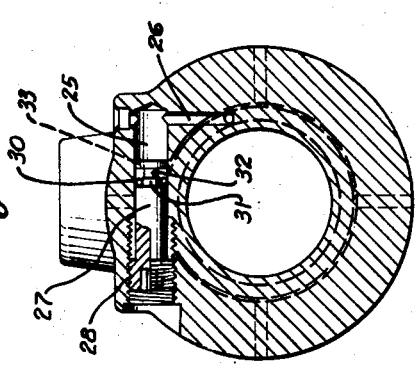
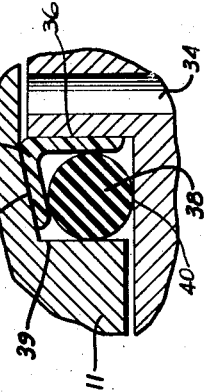
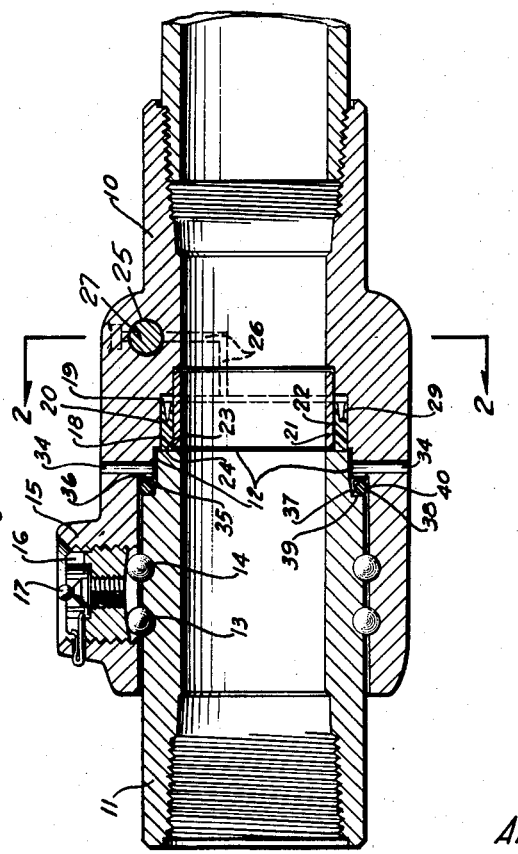
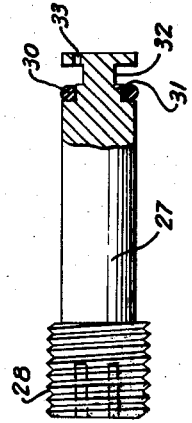
ARMAND L. FACCOU
INVENTOR.
BY Browning, Simms & Hayer
ATTORNEYS.

2,906,548
SWIVEL JOINT AND SEAL ASSEMBLIES

Armand L. Faccou, Santa Ana, Calif., assignor, by mesne assignments, to Chiksan Company, Brea, Calif., a corporation of California Application March 9, 1955, Serial No. 493,136

3 Claims. (Cl. 285—14)

This invention relates to pipe joints or couplings and more particularly to pipe couplings of the type which interconnect two pipe elements for rotary movement with respect to each other and yet maintain a fluid-tight joint therebetween to prevent leakage. This type of pipe coupling is commonly known as a "swivel joint." In another aspect, the invention relates to a swivel joint particularly adapted for handling of chemicals and other corrosive materials. In still another aspect, it relates to seals and seal assemblies particularly adapted for use in swivel joints. In yet another of its aspects, it relates to a one-way seal for a piston-cylinder assembly.

As indicated above, a swivel joint usually comprises two intercommunicating conduit or pipe elements which have a clearance or space therebetween which must be sealed. The seal for this clearance must permit relative rotary movement of the conduit elements and hence its primary purpose is to effect a rotary type seal. The provision of a satisfactory rotary type seal is usually considered to be more difficult than the provision of a reciprocal type seal, that is, a seal between one part reciprocating with respect to another. This difficulty of providing a rotary type seal is particularly accentuated in a swivel joint design because not only must the seal be effective to prevent leakage between the two conduit elements of the swivel joint but must do so without unduly increasing the torque required to cause relative rotation therebetween. Further, the seal should be both simple to install and positive in operation and yet form an effective seal despite exposure to fluids having pressures and temperatures varying over a broad range. It is a general object of this invention to provide a swivel joint having a seal capable of accomplishing the foregoing desiderata not only when constructed of conventional materials, such as rubber, but also when constructed of materials not having the resilient qualities of ordinary rubber and therefore not adapted to be employed as simple substitutes for ordinary rubber.

Thus, it is frequently desirable to employ seal materials which are of greater resistance to chemicals and other corrosive substances being handled by the swivel joint than is ordinary rubber or the like. Many such materials do not have the resiliency or the coefficient of elasticity of rubber so that it is difficult or substantially impossible for them to effect a satisfactory seal between two parts by virtue of their inherent resiliency as does ordinary rubber. For example, "Teflon" (a polytetrafluoroethylene resin) or "Kel-F" (a polytrifluorochloroethylene resin) have been found to be inert to a host of chemical substances which destroy rubber. These materials, as well as other synthetic resins, do not have the compressionable or tensionable qualities of ordinary rubber so that it is difficult to radially distort or to circumferentially stretch or compress the same in effecting a seal, particularly between parts having considerable clearance or variations in clearance therebetween. In many applications, it would be highly desirable to possess a swivel joint effectively sealed with such resistant materials and it is another general object of this invention to provide a swivel joint and a seal therefor so constructed and arranged that the material for the seal can be selected from those exhibiting a natural resiliency or coefficient of elasticity occurring anywhere within a broad range and yet capable of forming an effective seal can be formed between relatively rotatable parts. Accordingly, for such construction, the seal material can be selected for its inertness and stability or other desirable property with little regard for its resiliency or coefficient of elasticity.

Another object is to provide a swivel joint in which an annular piston seal forms a reciprocal type seal with one element of the swivel joint to retain a pressure fluid in a chamber therein over extended periods of time and is also movable to form a rotary seal with the other element of the joint, such movement being caused by said fluid pressure and also being axial so that radial distortion or circumferential stretching or compression of the seal is substantially avoided.

Another object is to provide an assembly in which the clearance or space between two intercommunicating conduits is sealed by an annular piston seal means which is mounted on one conduit for axial movement across the clearance into sealing engagement with the other conduit to form a rotary seal therewith without substantial radial distortion or circumferential stretching or compressing of the piston seal means while at the same time employing the piston means to form a reciprocal type seal with the walls of a variable volume chamber in one of the conduits to retain a pressure fluid therein which acts to move the piston means axially to form the rotary seal.

Another object is to provide an assembly for sealing the clearance between relatively rotatable conduits wherein an annular piston seal is moved axially from a first conduit to bridge across the clearance for sealing engagement with a second conduit without substantial radial distortion or circumferential stretching of the piston seal to thereby form a rotary seal with the second conduit and wherein the piston seal forms a reciprocal seal with inner and outer circumferential walls fixedly carried by the first conduit so that relative rotation between the two conduits can take place at the rotary seal without causing relative movement between the inner and outer circumferential walls such as would necessarily disturb the reciprocal seal therewith whereby retention of an actuating fluid under pressure in a chamber defined by the walls and the piston seal can be satisfactorily accomplished over extended periods of time despite substantial rotation between the conduits.

Another object is to provide an assembly wherein the clearance between two intercommunicating conduits is sealed by an annular seal disposed in an annular recess in one of the conduits for axial movement across the clearance into sealing engagement with the other conduit under the influence of fluid pressure applied to the recess behind the annular seal, the axial movement of the seal avoiding any substantial radial distortion or circumferential stretching of the seal whereby the fluid pressure can be supplied at a relatively lower value since substantially none of the force developed by such pressure is expended in distorting the seal in providing the sealing engagement. As a result, there is less likelihood of leakage of such fluid from the recess.

Another object is to provide a seal for a clearance between two conduits wherein a seal ring is provided with a generally L-shaped cross-section so that the seal bridges across the clearance with the legs thereof lying against surfaces disposed to either side of the clearance, the legs being urged into sealing engagement with such surfaces by a resilient ring lying between the legs, the resilient ring also being urged into engagement with at least one of such legs by another surface on a conduit, Another object is to provide such a seal in which the seal ring is of a material such that it desirably should be forced into sealing engagement with such surfaces by the resilient ring.

Another object is to provide a one-way sliding seal between a plunger or piston and cylinder in which movement of the piston in one direction causes a seal ring to form such a sliding seal between the piston and cylinder and movement of the piston in an opposite direction causes a clearance to be provided around the seal ring to permit fluid to by-pass the same.

Another object is to provide a swivel joint in which an annular piston seal is urged into sealing relationship between two conduit elements by a pressure fluid acting in a closed chamber behind the piston, the pressure of the fluid in the chamber being made variable to regulate the force with which the piston seal is urged into its sealing position by means of a pressurizing piston or plunger carried by one of the conduit elements and reciprocal to vary the volume of the chamber, the pressurizing piston including means for preventing a vacuum being exerted within the chamber upon movement of the pressurizing piston in a direction to increase the volume of the chamber, whereby the pressurizing piston can be so moved without pulling the piston seal away from sealing contact with the conduit elements.

Other objects, advantages and features of this invention will be apparent to one skilled in the art upon a consideration of the written specification, the appended claims and the attached drawings wherein:

Fig. 1 is a longitudinal cross-sectional view illustrating one embodiment of the invention in the form of a swivel joint;

Fig. 2 is a cross-sectional view taken on the line 2—2 of Fig. 1 to better illustrate the details of a pressurizing piston or plunger employed to effectuate a seal between two relatively rotatable parts;

Fig. 3 is an enlarged view of the pressurizing piston shown in Fig. 2 to better illustrate its arrangement; and Fig. 4 is an enlarged view of the L-shaped seal of Fig. 1.

Like characters of reference are used throughout the several views to designate like parts.

In the drawings, two relatively rotatable and intercommunicating conduit elements are illustrated in the form of a coupling nipple 10 telescoping over a swing nipple 11. Since the two nipples are to freely rotate relatively to each other, a clearance 12 is provided therebetween to reduce friction or the torque required for rotation. Means are also provided for connecting the swing and coupling nipples so as to permit their relative rotation while preventing relative longitudinal movement. Such means can comprise an antifriction device in the form of two circumferential rows 13 and 14 of ball bearings disposed in radially aligned races or grooves in coupling nipple 10 and swing nipple 11. The coupling nipple can be provided with a boss 15 having a ball plug 16 which can be removed so the balls in rows 13 and 14 can be also removed or inserted. The lower surface of the ball plug is shaped so as to retain the balls which are in contact therewith in proper place in their grooves in swing nipple 11. If desired, a grease fitting 17 can be provided to permit the injection of lubricant into the ball race assembly.

In order to seal clearance 12 between the two conduit elements, an annular piston seal means 18 is disposed with one of its ends in an annular recess 19 in the coupling nipple. Recess 19 can be simply formed by cutting an annular notch in the coupling nipple to provide an outer circumferential surface 20 and then tightly pressing sleeve 21 in place to provide an inner circumferential face 22.

Piston seal means 18 is, as stated, annular and is reciprocally mounted in recess 19 for axial movement of an outer end 23 thereof into rotary sealing engagement with an endwise surface 24 on swing nipple 11. While surface 24 is illustrated as being disposed in a radial plane with respect to the longitudinal axis of the swing nipple, it can have other dispositions and configurations as long as piston seal means 18 can be moved axially to bring a laterally extending surface on the piston means into abutment with surface 24. With such arrangement, the piston seal means can be moved axially and outwardly of recess 19 to bridge across clearance 12 and form a rotary seal with surface 24. During such movement and the formation of such rotary seal, the piston seal means is not substantially radially distorted or circumferentially stretched or compressed. Therefore the natural resiliency or coefficient of elasticity of the piston seal means is of little consequence during such movement and it is not necessary to cause any substantial flow of material of the piston seal means in order to bring it into sealing contact with surface 24.

The above characteristic of the described arrangement finds particularly advantageous use when the piston seal means is made of a material such as one having a sufficiently high coefficient of elasticity as to be difficultly circumferentially stretched or compressed. Among such materials are the halogenated polyethylene resins, such as polytetrafluoroethylene and polytrifluorochloroethylene. Such materials exhibit not only a high resistance to chemical reaction (i.e. are substantially inert) but also have a very low coefficient of friction relative to a metal surface. They accordingly find admirable use in swivel joints handling corrosive substances to which ordinary plastic or rubber sealing materials are not immune from attack. Unfortunately, these and other more resistant materials do not have the inherent tensionable or compressionable qualities of conventional rubber in that they have a considerably higher coefficient of elasticity than does ordinary rubber such as that used in conventional O-rings and hence they cannot be simply substituted for use in place of rubber. In accordance with this invention, means are provided which permit the use of such materials in the formation of seals and to compensate for their lack of inherent resiliency. However, it should be pointed out that the concept of this invention is applicable to sealing materials having a coefficient of elasticity or resiliency varying over a broad range from natural rubber to steel even though it finds particular application with regard to those materials which have a resiliency or a coefficient of elasticity within the upper part of such range and substantially greater than ordinary rubber such as used in the manufacture of O-rings. Thus, means are provided for urging the piston seal means against a surface or surfaces to maintain a fluid-tight seal therewith even though the material from which the piston means is constructed has a sufficiently low resiliency or high degree of elasticity that it in itself cannot be depended upon to form such a fluid-tight seal. Thus, referring to the drawings, means are provided for supplying and maintaining a fluid under pressure in recess or chamber 19 and such means can take the form of a cylinder 25 communicating via passage 26 with recess 19. A pressurizing piston or plunger 27 is reciprocally mounted in the cylinder for varying the capacity of the cylinder 25 and hence the pressure of fluid within cylinder 25, passages 26 and recess 19. The position of the piston can be readily adjusted by screwing it into and out of cylinder 25 as by threads 28.

As indicated above, the cylinder, passages and recess are filled with a flowable, substantially incompressible pressure transmitting material such as grease. Then, upon movement of piston 27 into cylinder 25, the pressure on the grease or other packing medium is increased and this in turn acts upon the inner end of piston seal means 18 to urge it outwardly so that its outer end 23 is brought into sealing engagement with surface 24. The piston seal means is provided with a sliding or reciprocal seal with the relatively fixed inner and outer walls 20 and 22 and such seal can be formed by recessing the inner end of the piston seal means to provide lips 29. These lips, of course, are pressed outwardly into sealing engagement with the inner and outer walls by the pressure of the packing medium being sealed against. Accordingly, piston seal means 18 serves not only to provide a rotary seal between the swing nipple and coupling nipple but also serves to retain the pressurized packing medium in recess 19 so that the pressure of such medium can be maintained over extended periods of time. In a preferred embodiment, lips 29 are made of sufficient longitudinal length and sufficiently thin that the force they exert on the walls of the recess under the influence of the pressure medium creates enough resistance to rotation of the piston seal means that it does not rotate even though its end 23 is in frictional contact with a rotating surface 24. In other words, the resistance to rotation created by the lips is greater than the force tending to cause rotation. Further, piston 27 is adjustable in its position in cylinder 25 so that the force exerted by piston seal means 18 on sealing surface 24 is readily adjustable from the exterior of the swivel joint. Therefore the sealing pressure can be increased as the pressure interiorly of the swivel joint increases so that the frictional resistance (torque) necessary to cause relative rotation between the swing and coupling nipples can be maintained at a minimum consistent with forming an effective rotary seal with surface 24. In this connection, it should be noted that while increasing the pressure of the medium in the recess 19 causes greater friction between end 23 and surface 24, it also increases the force exerted by lips 29 on the recess resisting turning of the piston seal means. Accordingly, piston seal means can be prevented from rotating in recess 19 even though end 23 thereof is urged into very tight engagement with surface 24. It should further be noted that since the force applied to piston seal means 18 by the pressure medium in recess 19 does not have to radially distort or circumferentially stretch the piston seal means in perfecting the rotary seal, the pressure of such medium required to perfect the seal is lower than it would be if distortion or stretching were required. Since the pressure is lower, there is less likelihood of leakage past lips 29.

It may be desirable from time to time to withdraw piston 27 from cylinder 25 in order to add to the packing medium in the cylinder. Since such a withdrawal would tend to cause a vacuum to be created in the cylinder and hence in recess 19 which would tend to pull piston seal means 18 away from surface 24, a one-way seal is provided between the piston and cylinder so that upon movement of the piston in one direction, a sliding seal is formed between the piston and cylinder and upon movement in an opposite direction, the sliding seal is broken and fluid allowed to by-pass around the seal. Thus, such a one-way seal can comprise a resilient seal ring 30 (e.g. an O-ring) having frictional engagement with the walls of cylinder 25 and disposed in a groove in the piston comprising a larger diameter portion 31 and a smaller diameter portion 32. The diameter of portion 31 is made to be slightly larger than the inside diameter of seal ring 30 so that when the seal ring is disposed therearound, an initial seal is formed between portion 31 and the ring as well as between the ring and the walls of cylinder 25. However, upon movement of the piston in a direction to withdraw it from cylinder 25, the frictional resistance between ring 30 and the walls of the cylinder tends to maintain the ring against movement. Accordingly, sufficient movement of piston 27 will eventually cause the ring to be disposed around portion 32. Portion 32 is made of a smaller diameter than the inside diameter of the ring so as to provide a clearance therebetween through which fluid can by-pass. As a result, atmospheric pressure will be applied to cylinder 25 to prevent the formation of a vacuum therein. To assure the freedom of flow of by-pass fluid, a port 33 is provided to communicate between the inner end of piston 27 and the clearance between seal ring 30 and smaller diameter portion 32. When the piston moves into cylinder 25, it moves relatively to ring 30 due to the frictional resistance between the ring and the walls of cylinder 25. As a result, the ring moves from its position around smaller diameter portion 32 into position around larger diameter portion 31 where it effectively forms a sliding seal between the piston and cylinder.

In order to prevent any fluid which might leak past piston seal means 18 from entering the ball bearing chamber, passages 34 can be provided from clearance 12 downstream of the piston sealing means to the exterior of the swivel joint to permit any leakage to drain therefrom. Further, another seal can be provided to seal the joint between the swing and coupling nipples to further assure against any leakage entering the ball bearing chamber and also to retain any grease or other lubricant within this chamber. Such a seal can comprise a seal ring 35 of generally L-shaped cross-section adapted to bridge across peripheral clearance 12. Such bridging can be accomplished by abutting one of the legs of the seal against an endwise surface 36 on the coupling member and the other leg against a circumferential surface 37 on the swing nipple. Seal ring 35 may be constructed of Teflon or other similar substance that has properties which require a medium to keep it in sealing position. In the drawing, a resilient ring, such as O-ring 38, is shown to act as such medium. The O-ring is of such diameter that when positioned between the legs of the L-shaped section, it is tensioned so that such tension results in the O-ring tending to push one leg of the L against circumferential surface 37 and also the other leg against endwise surface 36. Also, the O-ring can be urged into abutment with the legs of seal ring 35 by its contact with an endwise surface 39 on swing nipple 11 and a circumferential surface 40 on coupling nipple 10. With this arrangement, seal ring 35 bridges across circumferential joint 12 to form a seal with surfaces lying on either side of the joint and is urged into such sealing relationship with such surfaces by either or both of tension in O-ring 38 or abutment of the O-ring with opposing surfaces 39 or 40. When the O-ring is in such abutment with surfaces 39 or 40, it will inherently form a seal therewith. Circumferential surface 37 is shown as slightly tapered inwardly to allow the adjacent leg of seal ring 35 to be slightly deformed when assembled. This permits greater machining tolerances and still provides a fluid-tight seal. A similar type seal may be employed on the opposite end of the bearing chamber.

From the foregoing it will be seen that this invention is one well adapted to attain all of the ends and objects hereinabove set forth, together with other advantages which are obvious and which are inherent to the structure and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A swivel joint assembly for interconnecting two fluid conduits which comprises, in combination, a pair of intercommunicating conduit elements having a clearance therebetween to be sealed, antifriction means mechanically connecting the elements together for relative rotation while restraining relative axial movement therebetween, and seal means sealing the clearance between said elements comprising an annular ring having at least a portion of its cross-section generally L-shaped in configuration, one leg extending along and abutting an endwise surface on one element and the other leg extending along and abutting a circumferential surface on the other element, and a resilient O-ring lying within and in contact with the legs of said L-shaped section and also in sealing contact with surfaces on each of said elements, said O-ring when so positioned being in tension to urge the annular ring into contact with said circumferential surface.

2. A swivel joint assembly for interconnecting two fluid conduits which comprises, in combination, a pair of intercommunicating conduit elements having a clearance therebetween to be sealed; means mechanically connecting the elements together for relative rotation while restraining relative axial movement therebetween; first and second seal means spaced apart along said clearance; a relief passageway communicating between the exterior of the joint and the clearance intermediate said first and second seal means; said first seal means including an annular space between said elements at said clearance and defined by endwise and circumferential surfaces on said one element opposing respectively endwise and circumferential surfaces on the other element, a seal ring of L-shaped cross-section in said space with its legs respectively extending along and abutting said one element's endwise surface and said other element's circumferential surface, a resilient ring disposed within the legs of said L-shaped section and urged thereagainst by said other element's endwise surface and said one element's circumferential surface; said second seal means including inner and outer circumferential walls defining an annular recess extending axially into a first of the conduit elements, annular piston means disposed in said recess for axial movement across the clearance between the elements to bring an outer end of the piston means into sealing engagement with an endwise surface on a second of the conduit elements without substantial radial distortion of the piston means, and means for applying fluid under pressure to said recess behind said piston means to urge the same toward said second element, said piston means having a sliding seal with said inner and outer walls of said recess to prevent the escape of fluid therefrom.

3. The assembly of claim 2 wherein said means for applying pressure includes a piston disposed in a cylinder carried by said first element and communicating with said recess behind the piston means, said piston being movable into said cylinder to increase the fluid pressure within said recess to thereby increase the degree of sealing engagement between the piston means and said second element.

References Cited in the file of this patent

UNITED STATES PATENTS

| | | |
|---|---|---|
| 1,153,824 | Pierce | Sept. 14, 1915 |
| 1,912,494 | Patterson | June 6, 1933 |
| 2,063,368 | De La Rosa | Dec. 8, 1936 |
| 2,243,227 | Stratton | May 27, 1941 |
| 2,307,828 | Eggleston | Jan. 12, 1943 |
| 2,319,392 | Dick | May 18, 1943 |
| 2,330,197 | Allen et al. | Sept. 28, 1943 |
| 2,364,133 | De La Rosa | Dec. 5, 1944 |
| 2,382,375 | Allen et al. | Aug. 14, 1945 |
| 2,396,123 | Phillips | Mar. 5, 1946 |
| 2,462,006 | Schmitter | Feb. 15, 1949 |
| 2,494,598 | Waring | Jan. 17, 1950 |
| 2,509,091 | Faccou | May 23, 1950 |
| 2,531,596 | Allen et al. | Nov. 28, 1950 |
| 2,536,898 | Works | Jan. 2, 1951 |
| 2,538,683 | Guiler et al. | Jan. 16, 1951 |
| 2,565,923 | Hrdlicka | Aug. 28, 1951 |
| 2,614,793 | Storm | Oct. 21, 1952 |
| 2,789,847 | Jackson | Apr. 23, 1957 |
| 2,825,590 | Sutherland | Mar. 4, 1958 |

FOREIGN PATENTS

| | | |
|---|---|---|
| 658,055 | France | Jan. 22, 1929 |
| 592,233 | Great Britain | Sept. 11, 1947 |